Patented June 8, 1943

2,321,557

UNITED STATES PATENT OFFICE 2,321,557

PREPARATION OF ACETALS

Sidney Sussman, Moorestown, N. J., assignor to E. I. du Pont de Nemours & Company, Wilmington, Del., a corporation of Delaware No Drawing. Application September 28, 1940, Serial No. 358,879

8 Claims. (Cl. 260—615)

This invention relates to unsymmetrical acetals and a process for their preparation and, more particularly, to the preparation of unsymmetrical acetals by reacting (methoxymethoxy) ethanol with a dissimilar acetal.

An object of the present invention is to provide a process for the preparation of unsymmetrical acetals by reacting (methoxymethoxy) ethanol with an acetal and more particularly with a formal. Another object of the invention is to provide a process for the preparation of such acetals by the substitution of the hydroxyl group of (methoxymethoxy) ethanol by a substituted alkoxy group. Yet another object of the invention is to provide a process for the preparation of ethers of (methoxymethoxy) ethanol by the interaction of a formal with (methoxymethoxy) ethanol in the presence of acidic type catalysts. Other objects and advantages will hereinafter appear.

(Methoxymethoxy) ethanol has the empirical formula: $CH_3OCH_2OCH_2CH_2OH$. According to the process of the invention it has been found that this alcohol can be reacted with acetals, preferably under reflux, and in the presence of an acidic catalyst to give higher oxygenated organic compounds and more particularly ethers of (methoxymethoxy) ethanol. The reaction is conducted in such a manner that when equilibrium has been substantially reached, the catalyst, if any, is neutralized and the desired unsymmetrical actal, by-product alcohol and any excess of unreacted acetal, are removed by fractional distillation which separates these materials, the residue being treated, if desired, with additional acetal and catalyst and recycled. In lieu of starting with acetals such as the formals, a formal-alcohol azeotrope may be employed, the alcohol portion of these azeotropes being preferably the alcohol formed as a result of the reaction of the acetal with the (methoxymethoxy) ethanol.

The reaction is preferably conducted under reflux at one atmosphere pressure, although super or subatmospheric pressures may be employed if desired. The temperature of the reflux will, of course, be determined by the nature of the constituents being reacted and the pressure superimposed on the reactants.

It has been indicated that the reaction proceeds preferably in the presence of an acidic type catalyst such, for example, as sulfuric acid, paratoluenesulfonic acid, camphor sulfonic acid, hydrochloric acid, or other suitable acidic catalysts of this general character. Such catalysts should be present in amounts ranging preferably between 0.001 to 0.1 parts thereof per part of the (methoxymethoxy) ethanol reacted.

In view of the fact that the reaction involves fundamentally equimolecular proportions of the (methoxymethoxy) ethanol and acetal, they should be employed, theoretically, i. e. to satisfy stoichiometric requirements, substantially in equimolecular proportions. It has been found, however, that it is preferable to have the acetal present in excess, say up to 10 moles thereof per mole of the (methoxymethoxy) ethanol and preferably between 2 to 6 moles of the acetal per mole of the (methoxymethoxy) ethanol.

Generically, the reaction may be illustrated as proceeding in accord with the following equation:

(1) 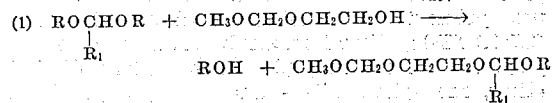

wherein the R and $R_1$ groups are hydrogen and/or hydrocarbon radicals. More specific examples of the above reaction may be illustrated by the following equations:

(2) 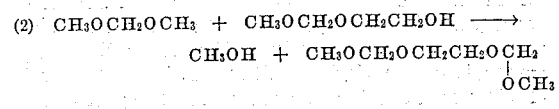

(3) 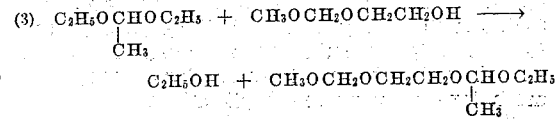

Equation 2 illustrates the interaction of methylal with (methoxymethoxy) ethanol to give 1,2-di-(methoxymethoxy) ethane, while Equation 3 illustrates the interaction of diethyl acetal with (methoxymethoxy) ethanol to give 1-(methoxymethoxy)-2-(α-ethoxyethoxy) ethane.

It has been indicated that the reaction is directed principally to the preparation of unsymmetrical acetals but it is likewise possible to produce the symmetrical acetal by reacting, in accord with the process described, two moles of the (methoxymethoxy) ethanol with one mole of the acetal, for example, when the reaction is conducted under such conditions di(β,β'-(methoxymethoxy) ethyl) formal having the empirical formula: $CH_2(OCH_2CH_2OCH_2OCH_3)_2$, will be produced from (methoxymethoxy) ethanol and methylal and similarly the higher symmetrical acetals of (methoxymethoxy) ethanol may be obtained.

In the above generic equation it has been indicated that the R groups may be hydrogen as well as hydrocarbon radicals. In the event that both R groups are hydrogen the formula designates an aqueous solution of an aldehyde and under such circumstances it will be found that still another class of oxygenated organic compounds may be obtained. Thus, by reacting an aqueous aldehyde, such, for example, as an aqueous solution of formaldehyde with the (methoxymethoxy) ethanol, 1,2 - di(methoxymethoxy) ethane will be produced.

The example given here illustrates a preferred embodiment of the invention but it will be understood that the invention is not restricted to the particular details thereof. Parts given are by weight.

*Example 1.*—A mixture consisting of 318 parts of (methoxymethoxy) ethanol, 1140 parts of methylal and 8 parts of sulfuric acid was boiled 5 hours under a return condenser. Subsequent to addition of 500 parts of methylal, 500 parts of methylal-methanol azeotrope (B. P. 41.8° C., 8% methanol) was removed from the reaction mixture by careful fractional distillation. Distillation of the product, after neutralization of the catalyst with sodium methoxide, through an efficient column gave 153.2 parts of 1,2-di(methoxymethoxy) ethane, B. P. 83° C./30.5 mm. This compound is a colorless liquid, miscible with water, methanol, and benzene, and has a density of 1.05 at 29° C.

The generic reactions given above indicate that acetals broadly may be employed in the process of this invention, the example illustrates the use primarily of methylene dimethyl ether, $CH_2(OCH_3)_2$, other formals, however, may be employed such, for example, as methylene diethyl ether, methylene diiso- and di-n-propyl ether, methylene diiso- and di-n-butyl ether and the higher symmetrical ethers of methylene glycol. The unsymmetrical ethers such, for example, as methylene methyl ethyl ether, methylene ethyl propyl ether, methylene methyl proply ether, and like higher unsymmetrical ethers may likewise be employed, but to prepare the unsymmetrical acetals of the present invention from these unsymmetrical methylene ethers, it is necessary to employ an acetal other than (methoxymethoxy) ethanol which may be considered to be an acetal, for as such it may be called di(β-hydroxyethyl) formal. Higher substituted methylene ethers may likewise be used such, for example, as methylene di(methoxy-ethyl) ether, $$CH_2(OC_2H_4OCH_3)_2$$

and the formal obtained from the reaction of formaldehyde with glycolic esters, $$CH_2(OCH_2COOR)_2$$

and the like. Homologues and analogues of the above acetals may be employed such, for example, as the symmetrical and unsymmetrical ethers of ethylidene, propylidene, etc., such as dimethyl, diethyl, and dipropyl ethers of ethylidene.

As has been indicated in the example, the formal produced as a result of the reaction is recovered after neutralization of the catalyst by an alkali and the neutralized product subjected to distillation. Since the boiling points of the unsymmetrical acetals produced are generally higher than the boiling points of the other constituents present in the reaction mixture, they can usually be readily separated from the latter by careful fractional distillation.

The unsymmetrical acetals obtained in accord with the process of this invention are useful as ingredients in the preparation of organic compounds and are likewise useful as solvents, of e. g., the cellulose derivatives such as cellulose acetate, cellulose nitrate, the ethers of cellulose, and as solvents, plasticizers, and other conditioning agents for natural and synthetic resins.

From a consideration of the above specification, it will be appreciated that many changes may be made in the details therein given without parting from the scope of the invention or sacrificing any of its advantages.

I claim.

1. The process for the preparation of an unsymmetrical acetal which comprises reacting an acetal with (methoxymethoxy) ethanol in the presence of an acidic catalyst.

2. The process for the preparation of an unsymmetrical acetal which comprises reacting under reflux temperatures under atmospheric pressure an acetal with (methoxymethoxy) ethanol in the presence of sulfuric acid as the catalyst.

3. The process for the preparation of an unsymmetrical formal which comprises reacting a formal with (methoxymethoxy) ethanol in the presence of an acidic catalyst.

4. A process for the preparation of 1,2-di(methoxymethoxy) ethane which comprises reacting methylal with (methoxymethoxy) ethanol in the presence of an acidic catalyst.

5. A process for the preparation of 1,2-di(methoxymethoxy) ethane which comprises reacting approximately 1140 parts of methylal with 318 parts of (methoxymethoxy) ethanol with 8 parts of sulfuric acid as the catalyst for approximately 5 hours under a return condenser.

6. A 1-(methoxymethoxy) 2-(alkoxyalkoxy) ethane.

7. 1,2-di(methoxymethoxy) ethane, $$CH_3OCH_2OCH_2CH_2OCH_2OCH_3$$

8. The process for the preparation of an unsymmetrical acetal which comprises reacting under reflux temperatures and atmospheric pressures an acetal with (methoxymethoxy) ethanol in the presence of from 0.01 to 0.1 part of an acidic catalyst per part of the (methoxymethoxy) ethanol.

SIDNEY SUSSMAN.